US006199762B1

United States Patent
Hohle

(10) Patent No.: US 6,199,762 B1
(45) Date of Patent: *Mar. 13, 2001

(54) METHODS AND APPARATUS FOR DYNAMIC SMARTCARD SYNCHRONIZATION AND PERSONALIZATION

(75) Inventor: William Hohle, Lehi, UT (US)

(73) Assignee: American Express Travel Related Services Co., Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/073,618

(22) Filed: May 6, 1998

(51) Int. Cl.[7] .................................................. G06K 19/067
(52) U.S. Cl. .............................................. 235/492; 705/66
(58) Field of Search ..................................... 235/380, 492; 705/41, 42, 66

(56) References Cited

U.S. PATENT DOCUMENTS

| | | | | |
|---|---|---|---|---|
| 4,928,001 | * | 5/1990 | Masada | 235/380 |
| 5,276,311 | * | 1/1994 | Hennige | 235/380 |
| 5,473,690 | * | 12/1995 | Grimonprez et al. | 380/24 |
| 5,530,232 | * | 6/1996 | Taylor | 235/380 |
| 5,729,717 | * | 3/1998 | Tamada et al. | 711/164 |
| 5,844,292 | * | 3/1999 | Baker et al. | 705/403 |
| 5,889,941 | * | 3/1999 | Tushie et al. | 395/186 |
| 5,912,453 | * | 6/1999 | Gungl et al. | 235/492 |

* cited by examiner

Primary Examiner—Mark Tremblay
(74) Attorney, Agent, or Firm—Snell & Wilmer, L.L.P.

(57) ABSTRACT

A system generally for personalizing and synchronizing smartcard data in the context of a distributed transaction system is disclosed. A dynamic smartcard synchronization system comprises access points configured to initiate a transaction in conjunction with a smartcard, an enterprise data collection unit, and a card object database update system. An exemplary dynamic synchronization system (DSS) preferably comprises various smartcard access points, a secure support client server, a card object database update system (CODUS), one or more enterprise data synchronization interfaces (EDSI), an update logic system, one or more enterprise data collection units (EDCUs), and one or more smartcard access points configured to interoperably accept and interface with smartcards. In an exemplary embodiment, DSS comprises a personalization system and an account maintenance system configured to communicate with CODUS. Personalization of multi-function smartcards is accomplished using a security server configured to generate and/or retrieve cryptographic key information from multiple enterprise key systems during the final phase of the smartcard issuance process.

4 Claims, 9 Drawing Sheets

| Field Name | Type | Max Length | Description |
|---|---|---|---|
| TPLOYALTY | 'C' | varies | Travel Partner-specific loyalty number (Frequent Flyer, Stayer, Renter, etc) |
| PIN | 'C' | varies | Travel Partner-specific PIN associated with above loyalty number (Frequent Flyer, Stayer, Renter, etc) |
| LASTNAME | 'C' | 30 | Last Name |
| FIRSTNAME | 'C' | 20 | First Name |
| MIDNAME | 'C' | 8 | Middle Name (or initial) |
| HONTITLE | 'C' | 8 | Honorary Title (Mr, Mrs, Ms, Dr, etc.) |
| NAMESUFIX | 'C' | 4 | Name Suffix (Jr, Sr, etc) |
| COMPNAME | 'C' | 30 | Company Name |
| HOMEADDRE1 | 'C' | 40 | Home Addres Line 1 |
| HOMEADDRE2 | 'C' | 40 | Home Addres Line 2 |
| HOMEADDRE3 | 'C' | 40 | Home Addres Line 3 |
| HOMECITY | 'C' | 25 | Home City |
| HOMESTATE | 'C' | 5 | Home State |
| HOMECOUNTR | 'C' | 2 | Home Country |
| HOMEZIP | 'C' | 10 | Home ZIP code (12345-1234) |
| HOMEPHONE | 'C' | 20 | Home Phone (No Punctuation; Numbers only: 7129991023) |
| HOMEFAX | 'C' | 20 | Home Fax (No Punctuation; Numbers only: 7129991023) |
| HOMEEMAIL | 'C' | 40 | Home Email Address |
| BUSADDRES1 | 'C' | 40 | Business Addres Line 1 |
| BUSADDRES2 | 'C' | 40 | Business Addres Line 2 |
| BUSADDRES3 | 'C' | 40 | Business Addres Line 3 |
| BUSCITY | 'C' | 25 | Business City |
| BUSSTATE | 'C' | 5 | Business State |
| BUSCOUNTRY | 'C' | 2 | Business Country |
| BUSZIP | 'C' | 10 | Business ZIP code (12345-1234) |

FIG.11

| | | | |
|---|---|---|---|
| BUSPHONE | 'C' | 10 | Business Phone (No Punctuation; Numbers only; 7129991023) |
| BUSEXT | 'C' | 4 | Business Phone Extention (No Punctuation; Numbers only; 1234) |
| BUSFAX | 'C' | 10 | Business Fax (No Punctuation; Numbers only; 7129991023) |
| BUSEMAIL | 'C' | 40 | Business Email Address |
| TITLE | 'C' | 20 | Business Title (Software Engineer, Customer Rep, etc) |
| EMPLOYEEID | 'C' | 10 | Employee ID |
| DIVISION | 'C' | 20 | Company Division |
| DEPARTMENT | 'C' | 20 | Company Department |
| PAYCARD1 | 'C' | 20 | Current Corporate Card Account Number "Repted" |
| PAYCARD1EX | 'C' | 8 | Corporate Card Expire Date |
| PAYCARD2 | 'C' | 20 | Previous Corporate Card Account Number |
| PAYCARD2EX | 'C' | 8 | Previous Corporate Card Expire Date |
| DRLICNUMBER | 'C' | 20 | Drivers License Number |
| DRLICSTATE | 'C' | 2 | Drivers License State |
| DRLICEXP | 'C' | 8 | Drivers License Expire Date (yyyymmdd) |
| DRLICTYPE | 'C' | 2 | Drivers License Type |
| PASSPORTNO | 'C' | 20 | Passport Number |
| PASSPORTCO | 'C' | 2 | Passport Country |
| ISSUEDATE | 'C' | 8 | Passport Issue Date |
| ISSUECITY | 'C' | 20 | Passport Issue City |
| EXPIREDATE | 'C' | 8 | Passport Expire Date |
| AIRPASSNAME | 'C' | 149 | IATA Air Passenger Name (LASTNAME/FIRSTNAMEINITIALTITLE) |
| AIRGENDER | 'C' | 1 | IATA Air Passenger Gender |

FIG.11A

METHODS AND APPARATUS FOR DYNAMIC SMARTCARD SYNCHRONIZATION AND PERSONALIZATION

TECHNICAL FIELD

The present invention relates, generally, to the use of integrated circuit cards ("smartcards") for commercial transactions and, more particularly, to techniques for dynamically synchronizing and personalizing smartcard information in the context of a distributed transaction system.

BACKGROUND ART AND TECHNICAL PROBLEMS

Recent advances in Internet commerce, electronic data-processing, and semiconductor device technology have lead to an increased interest in smartcard technology. Generally speaking, smartcards are wallet-sized (or smaller) cards incorporating a microprocessor or microcontroller to store and manage data within the card. More complex than magnetic-stripe and stored-value cards, smartcards are characterized by sophisticated memory management and security features. Multi-function cards, for example, are often configured to support credit, debit, stored value, loyalty, and a number of other applications all within a single card. A typical multi-function smartcard includes a microcontroller embedded within the card plastic which is electrically connected to an array of external contacts provided on the card exterior. The smartcard microcontroller generally includes an electrically-erasable and programmable read only memory (EEPROM) for storing user data, random access memory (RAM) for scratch storage, and read only memory (ROM) for storing the card operating system. Relatively simple microcontrollers are adequate to control these functions. Thus, it is not unusual for smartcards to utilize 8-bit, 5 MHZ microcontrollers with about 8K of EEPROM memory (for example, the Motorola 6805 or Intel 8051 microcontrollers).

A number of standards have been developed to address various aspects of integrated circuit cards, e.g.: *ISO 7816-1, Part 1: Physical characteristics* (1987); *ISO 7816-2, Part 2: Dimensions and location of the contacts* (1988); *ISO 7816-3, Part 3: Electronic signals and transmission protocols* (1989, Amd.1 1992, Amd. 2 1994); *ISO 7816-4, Part 4: Inter-industry commands for interchange* (1995); *ISO 7816-5, Part 5: Numbering system and registration procedure for application identifiers* (1994, Amd. 1 1995); *ISO/IEC DIS 7816-6, Inter-industry data elements* (1995); *ISO/IEC WD 7816-7, Part 7: Enhanced inter-industry commands* (1995); and *ISO/IEC WD 7816-8, Part 8: Inter-industry security architecture* (1995). These standards are hereby incorporated by reference. Furthermore, general information regarding magnetic stripe cards and chip cards can be found in a number of standard texts, e.g., Zoreda & Oton, *SMART CARDS* (1994), and Rankl & Effing, *SMART CARD HANDBOOK* (1997), the contents of which are hereby incorporated by reference.

It is desirable to maintain, for each smartcard held by a consumer, a substantially accurate history of transaction information and applications associated with the smartcard. Presently known systems are typically inadequate in this regard in that they do not provide efficient and reliable methods for ensuring synchronization between information stored on the smartcard and corresponding information stored on one or more external databases. As a result, present systems fail to ensure that lost or stolen cards may be reissued or replaced with up-to-date information.

Moreover, present systems are inadequate in that the systems often do not allow an enterprise, such as a smartcard corporate partner (for example, Hertz, Hilton and the like) to dynamically add to or otherwise modify the smartcard application structure itself. That is, in the context of multi-function cards, it is often infeasible to alter or augment the card's file structure without engaging in the time-consuming and costly process of re-issuing the card.

Furthermore, known methods of issuing and re-issuing smartcards in a multi-application, multi-enterprise environment are typically inadequate. More particularly, a smartcard often contains a number of different applications associated with a wide range of enterprise organizations. For security purposes, the writing, updating, and reading of these files is advantageously restricted to particular parties in accordance with a set of access condition rules. These access conditions are suitably implemented using cryptographic keys which are known only to the appropriate parties, such as the enterprise. Thus, a card issuing party such as American Express will typically not have access to the keys necessary to perform its function. Known systems have attempted to solve this problem by accumulating key data in a central repository used in the issuance process. This method is unsatisfactory in a number of respects. Most notably, a security breach in the central repository of key information would have disastrous consequences.

Techniques are therefore needed to overcome these and other limitations of the prior art. More specifically, systems are needed to provide secure and efficient personalization and dynamic synchronization of multi-function smartcards.

SUMMARY OF THE INVENTION

The present invention overcomes the limitations of the prior art by providing methods and apparatus for personalizing and synchronizing smartcard data in the context of a distributed transaction system.

In accordance with one aspect of the present invention, a dynamic smartcard synchronization system comprises access points configured to initiate a transaction in conjunction with a smartcard, an enterprise data collection unit, and a card object database update system. An exemplary dynamic synchronization system (DSS) preferably comprises various smartcard access points, a secure support client server, a card object database update system (CODUS), one or more enterprise data synchronization interfaces (EDSI), an update logic system, one or more enterprise data collection units (EDCUs), and one or more smartcard access points configured to interoperably accept and interface with smartcards. In an exemplary embodiment, DSS comprises a personalization system and an account maintenance system configured to communicate with CODUS.

In accordance with a further aspect of the present invention, personalization of multi-function smartcards is accomplished using a security server configured to generate and/or retrieve cryptographic key information from multiple enterprise key systems during the final phase of the smartcard issuance process.

BRIEF DESCRIPTION OF THE DRAWING FIGURES

The subject invention will hereinafter be described in conjunction with the appended drawing figures, wherein like numerals denote like elements, and:

FIG. 11 is an exemplary transaction data structure suitable for use in a travel context.

DETAILED DESCRIPTION OF PREFERRED EXEMPLARY EMBODIMENTS

Figure 1:
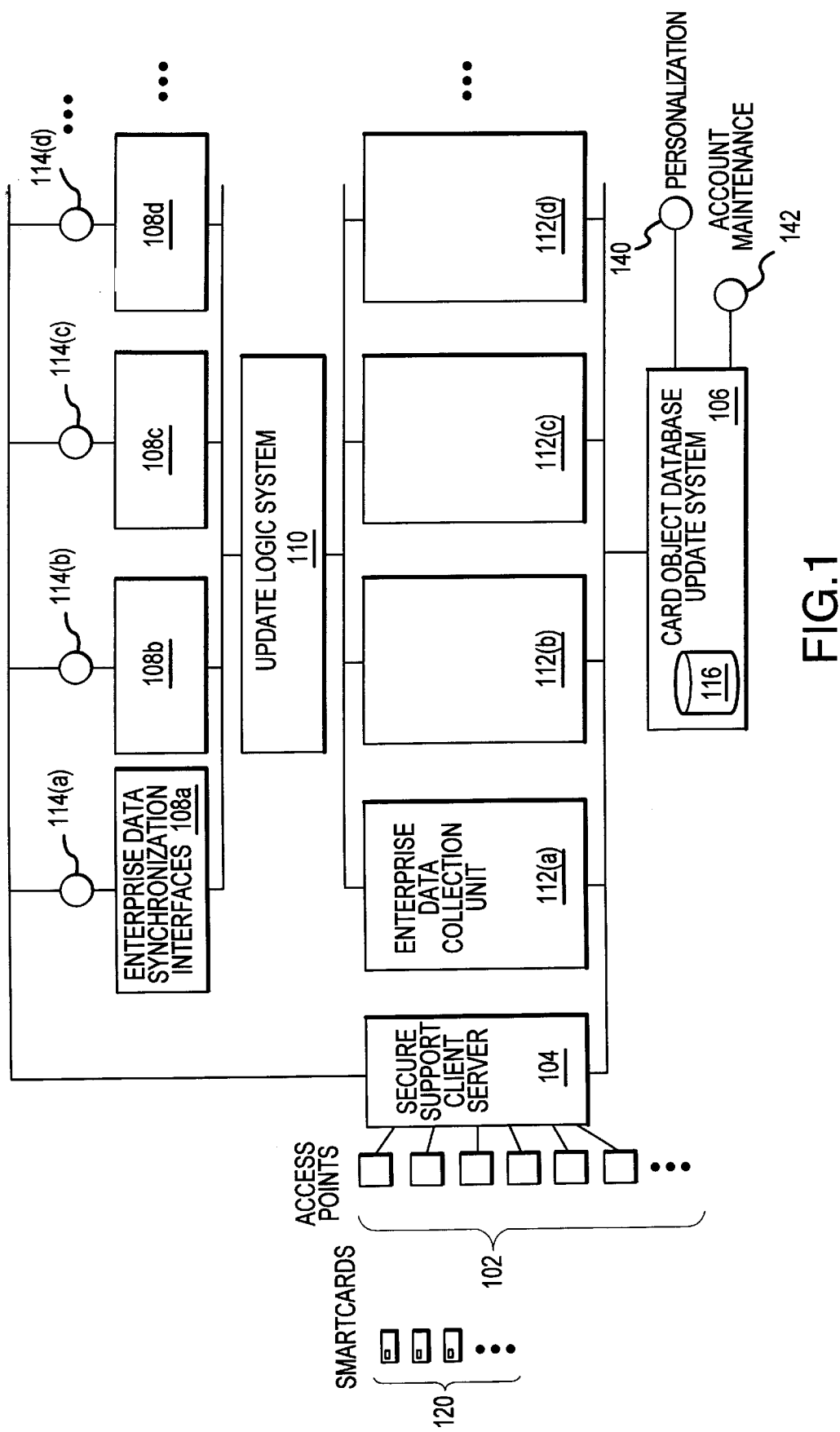
FIG. 1 is a schematic overview of an exemplary dynamic synchronization system in accordance with various aspects of the present invention.

A system in accordance with various aspects of the present invention includes methods and apparatus for personalizing and dynamically synchronizing smartcards and associated databases in the context of a distributed transaction system. More particularly, referring now to FIG. 1, an exemplary dynamic synchronization system (DSS) preferably comprises a secure support client server 104, a card object database update system 106 (CODUS), one or more enterprise data synchronization interfaces 108 (EDSI), an update logic system 110, one or more enterprise data collection units 112 (EDCUs), and one or more smartcard access points 102 configured to interoperably accept and interface with smartcards 120. In an exemplary embodiment, DSS also suitably comprises a personalization system 140 and an account maintenance system 142 configured to communicate with CODUS 106.

More particularly, in a preferred embodiment, secure support client server 104 is connected over a suitable network to EDSIs 108 through enterprise networks 114. EDSIs 108 are linked to update logic system 110, which itself is linked to enterprise data collection units 112. Enterprise data collection units 112 are linked to CODUS 106 and secure support client server 104. In general, as described in further detail below, each enterprise (e.g., airline partner, hotel partner, travel agency, etc.) is preferably associated with a corresponding EDSI 108, enterprise network 114, and EDCU 112. That is, EDCU 112(a) corresponds to EDSI 108(a) and enterprise network 114(a), EDCU 112(b) corresponds to EDSI 108(b) and enterprise network 114(b), and so on. The DSS may include an arbitrary number of such functional blocks in accordance with the number of enterprises represented.

Personalization system 140 suitably functions as the issuing source of smartcards 120. That is, personalization system 140 creates and issues smartcards for use by the consumer by providing a predetermined file structure populated with initialization data (e.g., account numbers, serial numbers, default preferences, and the like). In this regard, CODUS 106 interfaces with personalization system 140 in order to facilitate reissuance of the card by providing updated data in the event a card is destroyed, lost, or stolen. Personalization system 140 is described in detail below in conjunction with FIG. 9.

Account maintenance system 142 is provided for customer service purposes and, in this capacity, acts as the point of entry for cardholder complaints, questions, and other customer input. CODUS 106 suitably communicates with account maintenance system 142 in order to assist customer service representatives and/or automated systems in addressing cardholder issues.

Smartcard Access Points

Smartcard access points 102 allow the cardholder to gain access to the distributed transactions system through a variety of means. Such access points may include, for example, standard home telephones, various PCS wireless systems, pay phones, palmtop computers, notebook computers, Internet workstations, automated teller machines (ATMs), point of sale terminals (POS) stand-alone kiosks, network computers (NCs), personal data assistants (PDAs), or any other suitably configured communication apparatus. Access points 102 may be portable (as in the case of PDAs and cellular phones) or centrally located, for example, in airline ticketing and gate areas, rental car facilities, hotel lobbies, travel agencies, and malls. In addition, businesses might see fit to host an access point 102 to streamline their employees' business travel. In a preferred embodiment, various access points 102 are configured to interface with contact-based smartcards 120 in accordance with the relevant portions of the ISO-7816 standard.

Secure Support Client Server

Secure support client server 104 provides, where appropriate, any functionality missing from the individual access point 102 used during a transaction. Server 104 also suitably handles routing of messages from access points 102 to the appropriate EDSI 108 and/or EDCU 112.

Figure 2:
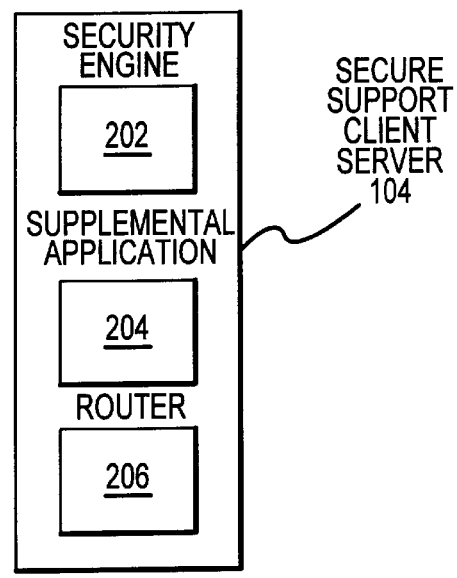
FIG. 2 is a schematic overview of an exemplary secure support client server.

Referring now to FIGS. 1 and 2, an exemplary secure support client server 104 comprises a security engine 202, a supplemental application support 204, and a router 206. Security engine 202 comprises suitable hardware and/or software to provide secure messaging between server 104, EDSUs 112, and enterprise networks 114. More specifically, security engine 202 utilizes authentication, data encryption, and digital signature techniques in connection with incoming and outgoing message packets. A variety of conventional security algorithms are suitable in the context of the present invention, including, for example, DES encryption, RSA authentication, and a variety of other symmetrical and non-symmetrical cryptographic techniques.

Supplemental application support 204 preferably comprises suitable hardware and/or software components related to a specific access point 102 functionality. More particularly, server 104 suitably determines the nature of the access point 102 utilized during a transaction. If the access point 102 does not include the appropriate software for effecting the requested transaction, then server 104 supplies the functionality (i.e., software modules) which completes the transaction with respective EDSIs 108 and/or EDCUs 112. The supplemental functionality includes, inter alia, software modules for properly formating message packets (described in further detail below) sent out over the various networks comprising the DSS. For example, where a transaction takes place via an access point 102 which consists entirely of a stand-alone smartcard reader, then nearly all functionality is supplied by server 104 because the smartcard reader, by itself, is only capable of transferring messages to and from smartcard 102 in a "dumb" manner. However, when a suitably configured PC is included for access point 102, most necessary functionality is supplied by various software modules residing in the PC. In such a case, server 104 need only transfer the various message packets to and from the access point 102 without supplying additional software. Added functionality may be supplied through any suitable method, for example, through the use of portable software code (e.g., Java, ActiveX, and the like), or distributed software residing within access points 102, cards 120, and/or server 104.

Router 206 suitably handles routing of messages to the appropriate EDCUs 112, enterprise networks 114, and access points 102. That is, router 206 is configured to identify the appropriate functional blocks within the DSS to which a given message packet should be sent. The identification of the appropriate functional blocks may take place in a number of ways. In a preferred embodiment, the identification is accomplished through the use of a look-up table comprising a list of appropriate destinations keyed to information extracted from requests received from access points 102.

In an alternate embodiment of the present invention, a secure support client server 104 is not used, and the functionality of access points 102 are suitably specified in order to obviate the need for server 104. Alternatively, the functions of server 104 may be allocated and distributed throughout the DSS components in any advantageous manner.

It will be appreciated by those skilled in the art that the term "transaction" refers, generally, to any message communicated over the system for effecting a particular goal, for example, debit/charge authorization, preference changes, reservation requests, ticket requests, and the like. FIG. 11, for example, shows an exemplary transaction data structure useful in the context of performing an on-line transaction with a travel partner, wherein the field name 1102, data type 1104 ('C' for character), maximum byte-length 1106, and description 1108 are listed in tabular form. In this example, the transaction messages suitably comprise comma delimited data packets, although other data structures may be employed.

Card Object Database Update System (CODUS)

Figure 6:
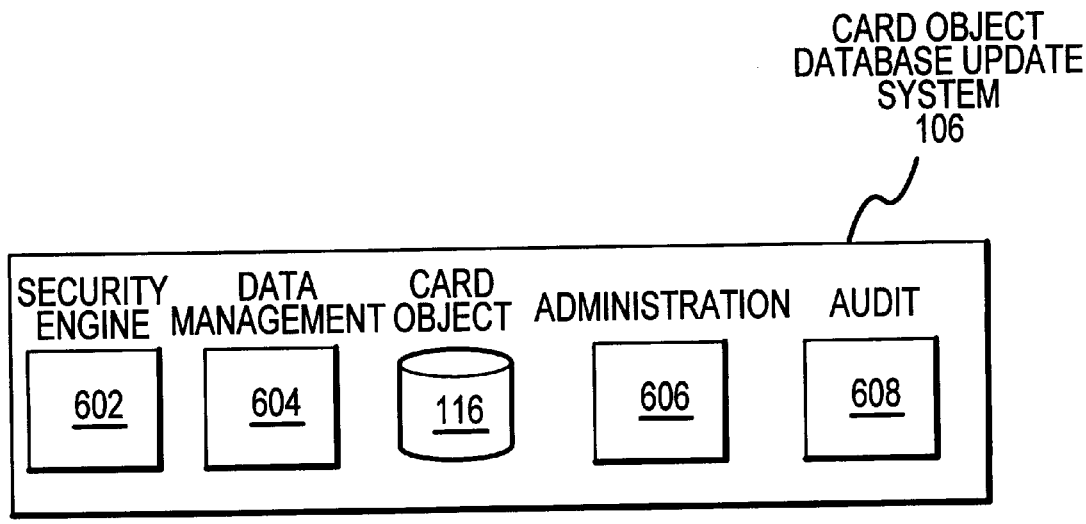
FIG. 6 is a schematic overview of an exemplary card object database update system (CODUS)

CODUS 106 suitably securely stores information related to the state of the various issued smartcards 120. Referring now to FIGS. 1 and 6, in a preferred embodiment, CODUS 106 comprises a security engine 602, a data management module 604, a card object database 116, a card object administration module 606, and an audit file 608.

Security engine 602 provides suitable security for, inter alia, the information stored within card object database 116. In this regard, security engine 602 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Data management module 604 suitably acts as a data interface between CODUS 106 and account maintenance 142 as well as between CODUS 106 and the various EDCUs 112. More specifically, module 604 converts and translates between the data format used in these systems. For example, data stored within object database 106 may not be stored in a format which can be easily used by EDCUs 112 or account maintenance 142. Accordingly, data management module 604 comprises suitable routines for effecting conversion and formatting of both incoming and outgoing data.

Card object administration module 606 preferably provides suitable database software to edit, update, delete, synchronize, and ensure non-corruption of data stored within object database 106. A variety of database packages are suitable for this task, including, for example, various conventional fourth-generation relational database management systems (4GL RDBMS).

Audit file 608 suitably tracks changes to object database 116, thereby helping to ensure the integrity of card data stored within CODUS 106. More particularly, when changes to object database 116 take place as a result of preference updates, transactions, application structure changes, and the like, audit file 608 tracks suitable information related to these changes, e.g., time, date, and nature and content of the change.

Card object database 116, which may comprise a single database or a set of distributed databases, is used to store the known state of the various smartcards 120. In general, the state of a smartcard is characterized by a suitable set of card indicia. In a preferred embodiment, wherein a data structure in accordance with ISO-7816 is employed, card object database 116 stores information related to the individual applications present on the various smartcards 120 (i.e., the overall file structure) as well as the individual fields, directories, and data that comprise those applications. A file structure for card object database 116 is chosen such that it includes a suitable set of data fields for a given smartcard 120.

Enterprise Data Synchronization Interface

Figure 3:
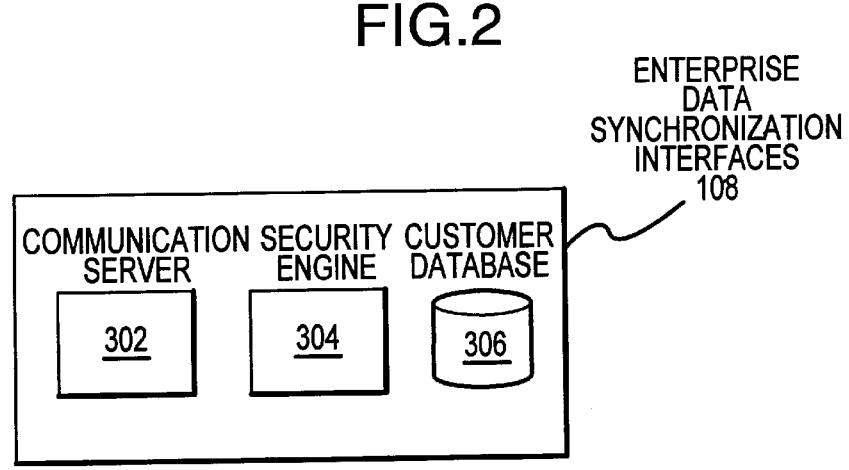
FIG. 3 is a schematic overview of an exemplary enterprise data synchronization interface.

In a preferred embodiment, the various EDSIs 108 track changes to smartcard data and/or applications corresponding to individual enterprises. With reference to FIGS. 1 and 3, in a preferred embodiment, EDSI 108 comprises a communication server 302, a security engine 304, and a customer database 306.

Communication server 302 suitably facilitates communication with enterprise networks 114 and update logic system 110. In this regard, server 302 is configured to translate between various formats, media, and communication protocols as may be necessary given the particular choice of components employed.

Security engine 304 provides suitable security measures with respect to the access and storage of information with customer database 306. Security engine 304 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Customer database 306 suitably provides a means for storing smartcard information related to individual partners or enterprises. That is, a particular enterprise (hosting, for example, enterprise network 114(*a*)) might compile, or employ others to compile, smartcard information related only to that enterprise. For example, a hotel chain might store loyalty, preference, and other data that relates specifically to that hotel chain. During synchronization (as described in further detail below) any changes to database 306 would be propagated through the system and, visa-versa, changes elsewhere in the system would be communicated to database 306. This communication is preferably done securely (using security engine 304) in conjunction with communication server 302.

In an alternate embodiment, the functionality provided by the EDSIs 108 are folded into the corresponding EDCU 112. That is, while an illustrated embodiment employs one or more physically separate EDSIs 108, it may be advantageous to further streamline the DSS by incorporate this functionality into the corresponding EDCU 112 functional block.

Update Logic System

Figure 4:
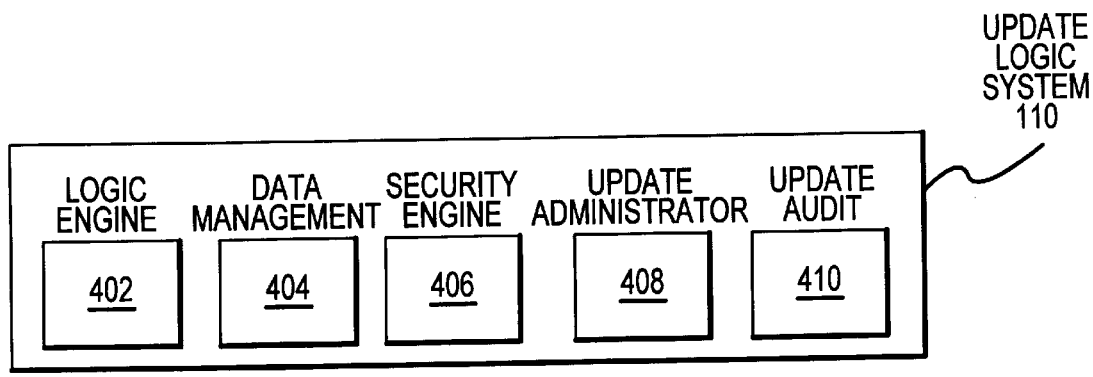
FIG. 4 is a schematic overview of an exemplary update logic system.

In a preferred embodiment, update logic system 110 formats and securely routes card data received from and transmitted to EDCUs 112 and EDSIs 108. Referring now to FIG. 4, in a preferred embodiment, update logic system 110 includes a logic engine 402, a data management module 404, a security engine 406, an enterprise update administrator 408, and an enterprise update audit module 410.

Logic engine 402 suitably functions to direct and distribute information changes across the system. Thus, logic engine 402 is able to determine which modules (i.e., which EDCUs 112 and EDSIs 108) need to reflect the change.

Data management module 404 suitable acts as a data interface between EDSIs 108 and EDCUs 112. More specifically, module 404 is able to convert and translate between data format used in these systems. Accordingly, data management module 604 comprises suitable routines for effecting conversion and formatting of both incoming and outgoing data.

Security engine 406 is used to provide suitable security measures with respect to data flowing through update logic system 110. Security engine 406 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical cryptographic techniques.

Enterprise update administrator 408 suitably comprises overhead software necessary to maintain data transfer between EDSIs 108 and EDCUs 112.

Enterprise update audit module 410 suitably tracks update information flowing through update logic system 110. More particularly, when information is communicated across update logic system 110, (as a result of preference updates, transactions, application structure changes, and the like), audit module 410 tracks suitable indicia of this information, e.g., time, date, and nature and content of the communication.

Enterprise Data Collection Unit

Figure 5:
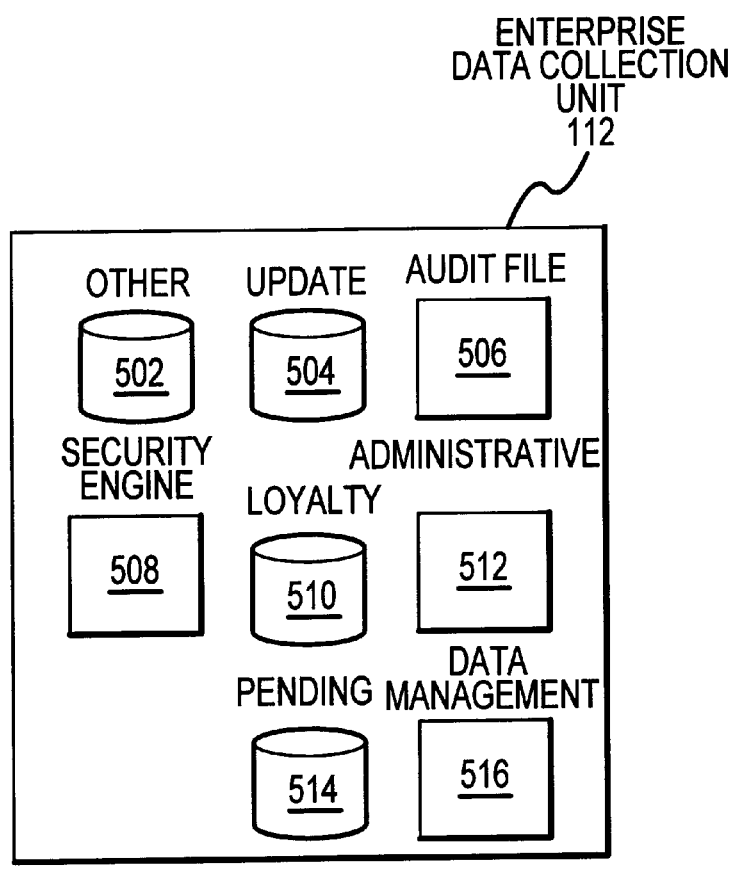
FIG. 5 is a schematic overview of an exemplary enterprise data collection unit.

EDCUs 112 preferably store and coordinate the transfer of synchronization data corresponding to a particular enterprise. With reference to FIG. 5, in a preferred embodiment, enterprise data collection unit 112 includes a security engine 508, a customer update transaction database 504, a customer loyalty transaction database 510, a customer pending transaction database 514, an update database 502, an EDCU audit file 506, an EDCU administrative file 512, and an EDCU data management module 516.

Security engine 508 is used to provide suitable security measures with respect to data flowing through EDCU 112. Toward this end, security engine 406 may utilize various authentication, data encryption, and digital signature techniques in connection with incoming and outgoing message packets. Suitable algorithms in the context of the present invention, include, for example, DES encryption, RSA authentication, and a variety of other symmetrical and non-symmetrical conventional cryptographic techniques.

Customer update transaction database 504 is used to store information which has been updated on a smartcard 120, but which has not yet propagated to the various databases and networks that require updating. For example, a smartcard 120 may be used to change cardholder preferences in the course of a transaction with a particular enterprise. This information would, in the short term, be stored in database 504 (for the particular enterprise) until it could be fanned-out to CODUS 106 and the appropriate EDCUs 112 and EDSIs 108. This type of transaction is described in further detail below.

Customer loyalty transaction database 510 is suitably used to store loyalty information (e.g., frequent flier, frequent stayer, etc.) associated with a particular enterprise or partner. In an alternate embodiment, a loyalty transaction database 510 is not employed—rather, the functionality of database 510 is incorporated into databases 502, 510, and 514 such that a loyalty transaction becomes just another transaction modality to be tracked by EDCU 112.

Customer pending transaction database 514 is suitably used to store information related to transactions which have taken place without direct use of the smartcard 120. More particularly, some transactions, such as preference changes and the like, may be initiated by a cardholder through a channel which does not involve use of the card, for example, through a verbal request over a standard telephone. In such a case, and as detailed further below, this data is suitably stored in pending transaction database 514. The transaction data remains in database 514 until the corresponding smartcard 120 is used in conjunction with an access point 120, whereupon smartcard 120 itself (as well as CODUS 106) is updated with this new information.

Update database 502 is suitably used to store other types of transactions, i.e., transactions which may not be classifiable as update, loyalty or pending. For example, update database 502 may be employed to store file structure updates as detailed below.

Audit file 506 is used to track changes to update database 504, pending database 514, database 502, and, in an illustrated embodiment, loyalty database 510. In an alternate embodiment, wherein no separate loyalty database 510 is used, audit file 506 tracks changes to databases 504, 514, and 502. Audit file 506 therefore helps to ensure the integrity of data in the respective files.

Administrative file 512 provides suitable database software necessary to edit, update, delete, synchronize, and ensure non-corruption of data stored within the various databases that comprise EDCU 112—i.e., databases 502, 504, 510, and 514.

Data management module 516 provides data management capabilities to facilitate data transfer between smartcards 120 and databases 504, 514, 502, and 510 as well as between these databases and the other systems—i.e., update logic system 110 and CODUS 106. Thus, data management module 516 acts as interface to ensure seamless transfer of data between the various systems.

Network

The various components, databases, modules, and apparatus described above in connection with the preferred embodiment are connected via a suitable data communication network. Such a network may consist of various physical connections using a variety of conventional data protocols, for example, the TCP/IP protocol. It will be appreciated that the individual connections between components of the present system may differ. For example, a wireless PCS network may be employed from an access point 102 to secure support client server 104, while a Internet TCP/IP connection may be employed from CODUS 106 to the various EDCUs 112.

Those skilled in the art will appreciate that a variety of hardware systems are suitable for implementing the present invention. Various modems, routers, CPU's, monitors, back-up systems, power-supplies, and peripherals may be employed to realize the benefits of the present system. In one embodiment, for example, a Compaq Prolinea computer operating in an OS/2 environment using IBM MQ Server software is used to implement secure support client server 104, wherein the various access points comprise stand-alone smartcard kiosks, an EDCU 112 and CODUS 116 is then implemented on a Compaq Prolinea computer operating in a Windows/NT environment running a suitable database software package.

Personalization System

Figure 9:
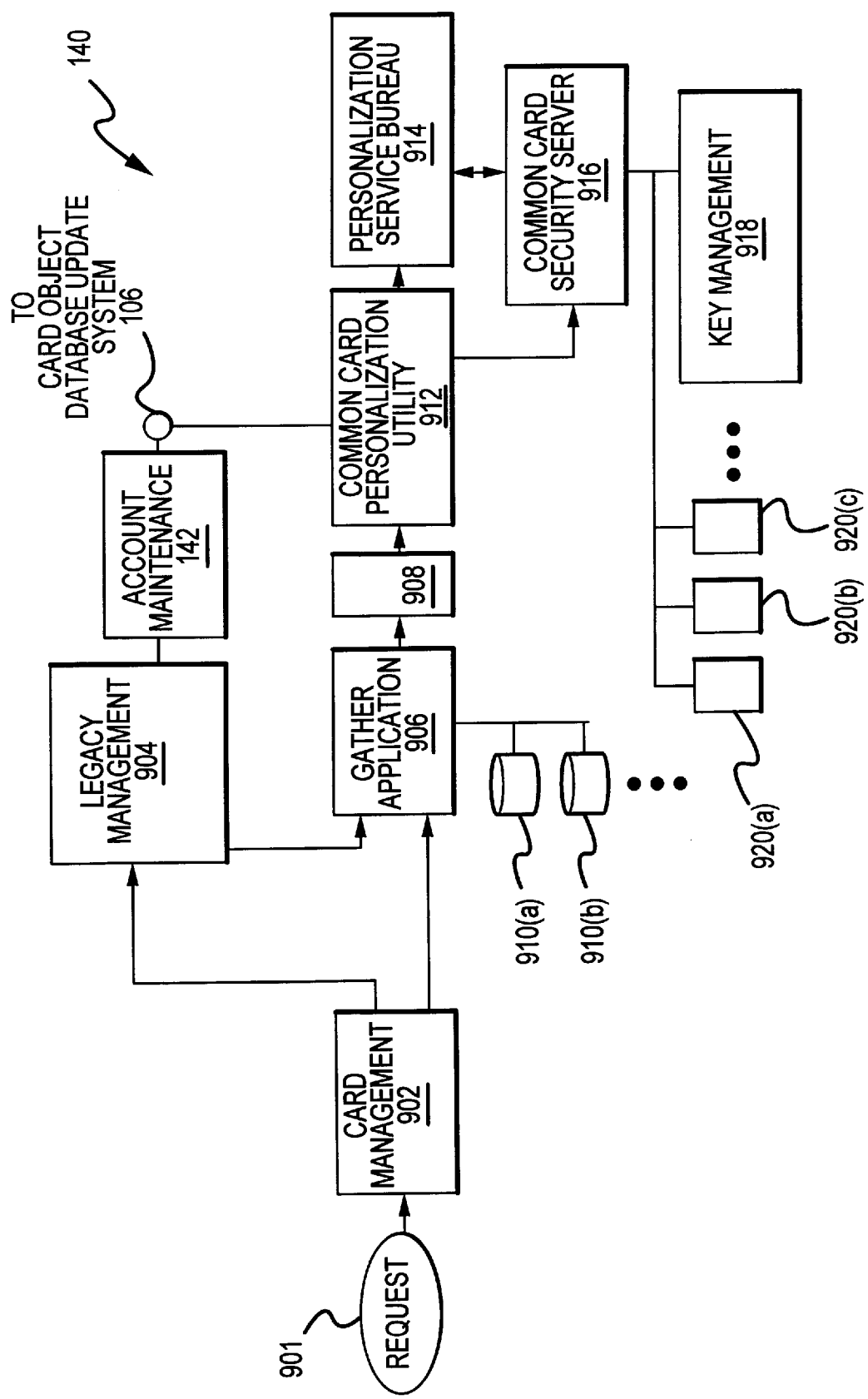
FIG. 9 is a schematic overview of an exemplary personalization system.

Referring now to FIG. 9, in a preferred embodiment, personalization system 140 suitably comprises a card management system 902, a legacy management system 904, a gather application module 906, one or more databases 910, an activation block 908, a common card personalization utility 912 (CCP), a service bureau 914, a common card security server 916, a key management system 918, and one or more key systems 920. Key management system 918 suitably comprises a database module 922, CID replace module 924, key system 926, and key system 928.

CCP 912 suitably communicates with CODUS 106 (shown in FIG. 1), and legacy management system 904 suitably communicates with account maintenance 142 which is also configured to communicate with CODUS 106.

Card management system 902 suitably receives the card request 901 and initiates the gathering of information from various sources. Generally, card request 901 consists of various request information intended to specify a desired group of card characteristics. Such characteristics might include, for example: a list of desired applications (airline, hotel, rental car, etc.); a designation of whether the card is new, a renewal, or a replacement; a list of default cardmember preferences corresponding to the desired applications; personal information related to the cardmember (name, address, etc.); and required security levels.

Card management system 902 suitably parses the card request and, for information already stored by the issuer, sends a request to legacy card management system 904. For information not available as legacy data, card management system 902 forwards the relevant components of card request 901 to gather application module 906. In an exemplary embodiment, card management system 902 chooses the optimum smartcard physical characteristics for a particular card request 901. That is, card management system 902 suitably determines the appropriate type of smartcard chip to be used based on a number of factors, for example, memory requirements and computational complexity of the desired security functions. Similarly, the optimum smartcard operating system (SCOS) may be chosen. In an alternate embodiment, the smartcard chip, operating system, and the like, are specified in card request 901.

Legacy management system 904 acts as a suitable repository of information related to the cardholder's past relationship—if any—with the card issuing organization. For example, a cardholder might have a long-standing credit or debit account with issuing organization (based on a standard embossed mag-stripe card) and this information might be advantageously incorporated into the issued card.

Gather application module 906 is suitably configured to receive information from card management system 902 and legacy management system 904 and then interface with the various databases 910 to gather all remaining application information specified in card request 901. Preferably, databases 910 correspond to and are associated with the individual partnering enterprises which offer smartcard applications for use in smartcard 120 (e.g., enterprise networks 114 in FIG. 1). Thus, for example, a card request 901 which included a request for a hotel application would trigger gather application 906 to initiate data communication with the appropriate hotel database 910. Hotel database 910 would then return information specifying the correct file structure, access conditions (security), default values, and other data necessary to configure smartcard 120 with the requested application. Communication with the various databases 910 may take place through any suitable means, for example, data communication over the Internet, PSTN, and the like, or through other channels, such as simple phone requests.

Activation block 908 is suitably used to provide a means for the cardmember to activate the card once it has been issued. For example, it is common for credit cards and the like to be sent to the cardmember unactivated, requiring that the cardmember call (or otherwise contact) an automated system at the issuer in order to activate the card. This is typically accomplished via entry of the card number and other suitable ID using a touch-tone phone. In this regard, activation block 908 is used to facilitate this function for the requested smartcard, i.e., to specify whether such activation is necessary for a particular card.

CCP 912 is used to create a correctly formatted card "object"—i.e., the operating system, file structure and all other available card data to be downloaded to card 120—then transfer this information to service bureau 914 (for creation of the smartcard) and CODUS 106 (for recording the card's state as issued). CCP 912 is preferably configured to tailor the format of the card object to the specific card issuance system to be used (described below). Thus, gather application system 906 can deliver a relatively high-level functionality request, and CCP 912 can create the specific "object" to be used in the implementation.

Personalization Service Bureau 914 comprises suitable hardware and software components to complete production of the smartcards for issuance to the respective cardmembers. In this regard, service bureau 914 includes a suitable smartcard "printer" to handle the transfer of information to the smartcard chip as well as any conventional embossing or mag-stripe writing that may take place. Suitably smartcard printers include, for example, any of the series 9000 and series 150i smartcard issuance systems manufactured by Datacard Corporation of Minnetonka, Minn.

Common card security server 916 (CCSS) suitably comprises software and hardware components necessary to retrieve cryptographic key information from various enterprise key systems 920. In an exemplary embodiment, this information is accessed by service bureau 914 in order to complete the personalization process. More particularly, it will typically be the case that a smartcard 120 contains a number of different applications associated with a wide range of enterprise organizations. One in the art will appreciate that the writing, updating, and reading of these files is advantageously restricted to particular parties in accordance with a set of access condition rules. These access conditions are suitably implemented using cryptographic keys which are known by the appropriate parties. Thus, service bureau 914—whose task it is to create and populate the card file structure—will not, ab initio, have access to the keys necessary to perform this function. As mentioned briefly above, known systems have attempted to solve this problem by accumulating key data in a central repository used in the issuance process, thereby creating an unacceptable security risk. Methods in accordance with the present invention, however, allow for communication between the smartcard and the individual key systems 920 as the card is being issued, thus allowing key information to be securely downloaded to the smartcard without the intervention of a third party. CCSS 916 is suitably used to facilitate this process by receiving information from CCP 912 regarding the identity of the various applications to be created in the various cards, then, when prompted by service bureau 914 (or, alternatively, prior to issuance by service bureau 914), contacting the appropriate key system 920 to request a key to be transmitted to service bureau 914 during personalization.

Key systems 920 comprise suitable database systems capable of storing, generating, and securely transmitting cryptographic keys associated with a particular enterprise. Key management system 918 is, in this context, a system comparable to key systems 920, but which is "owned" by the party implementing the personalization system. The key-generating function may be distributed between CCSS and key systems 920. That is, the keys may be generated in real time at CCSS 916 (in accordance with algorithms and key information received from the particular enterprises), rather than being generated at key systems 920.

It will be appreciated to one skilled in the art that the functional blocks illustrated in FIG. 9 may be implemented using a variety of hardware and software components, both off-the-shelf and/or custom-developed. Database-intensive functions performed, for example, by card management system 902, may be implemented using any suitable database package, e.g., Codebase, dbase, or the like.

Personalization Process

A personalization system as described above in conjunction with FIG. 9 is suitably used to efficiently issue a large number of smartcards with a wide range of functionality levels. This task involves obtaining and coordinating, in a timely fashion, accurate data for individual cardmembers across the various partnering enterprises supported by the system. In this regard, it may be the case that certain partnering enterprises desire to limit the dissemination of proprietary data. This data might include, for example, private keys used in connection with smartcard access conditions as well as file structure and cardmember personal data.

Figure 10:
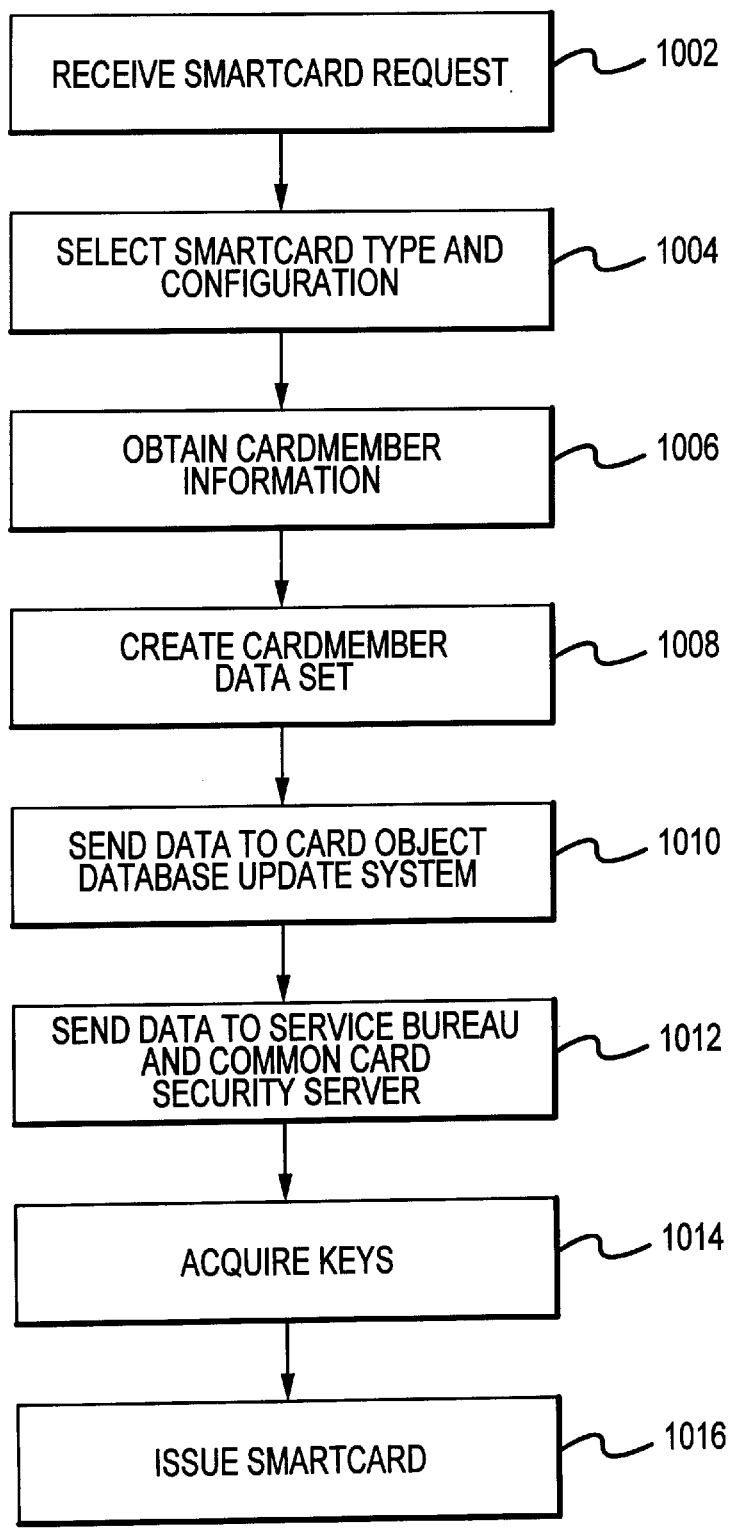
FIG. 10 is a flowchart depicting an exemplary method of smartcard personalization.

Referring now to FIGS. 9 and 10, an exemplary smartcard personalization process will now be described. First, in Step 1002, the system receives a smartcard request. As mentioned above, card management system 902 is suitably used to receive the card request and initiate the gathering of information from various sources. Card request 901 suitably consists of request information intended to specify a desired group of card characteristics. Such characteristics might include, for example: a list of desired applications (airline, hotel, rental car, etc.); a designation of whether the card is new, a renewal, or a replacement; a list of default cardmember preferences corresponding to the desired applications; personal information related to the cardmember (name, address, etc.); and required security levels.

Next, in Step 1004, the system selects the smartcard type and configuration appropriate for the given card request 901. This step is suitably performed by card management system 902. Thus, card management system 902 examines a number of factors in light of information received in card request 901 (e.g., memory requirements, desired security functions, and the like), then selects an appropriate smartcard chip from a library of available chips. In the same way, the optimum smartcard operating system (SCOS) may also be selected.

In Step 1006, cardmember information is obtained. This step is suitably performed by gather application module 906 operating in conjunction with databases 910 and legacy management system 904. More particularly, cardmember-specific information is preferably classified in two groups: information known to the personalization system, and information not known by the personalization system. Known information generally consists of data acquired through a past relationship with the organization hosting the personalization system. In such a case, certain data such as cardholder name, preferred billing address, title, company, etc., will most likely already be known, as will certain application data. Such information is suitably stored in, and may be retrieved from, one or more databases comprising legacy management system 904. As part of Step 1006, the system (specifically, module 908) preferably determines whether the card should require activation. That is, as mentioned briefly above, it is common to apply a sticker or the like to a card that notifies the cardmember that activation of the card is required prior to use. Activation typically involves the use of an automated phone system). The choice of whether a particular card requires activation may be based on a number of factors, for example, demographics, crime-rate numbers, or mail fraud statistics associated with the cardmember's zip-code number.

For data not included in legacy management system 904, gather application module 906 suitably communicates with databases 910 to retrieve the information needed to satisfy card request 901. This information will typically consist of file structure information, e.g., the DF and EF hierarchy, data types and lengths, and access condition specifications for the particular enterprise-sponsored application. For example, in the case where card request 901 includes a request for an airline application, gather application module 906 would contact the database corresponding to the enterprise hosting the airline application, then download all necessary file structure information. This process would continue in turn for each new or modified application to be incorporated into the smartcard.

In Step 1008, a full cardmember data set is created, suitably using CCP 912. This data set, or "card object", will ultimately be used by service bureau 914 to create the physical smartcard. The form of the card object may vary. In one embodiment, the card object comprises what has been termed a Binary Large Object ("BLOB"). The card object is preferably tailored to the selected smartcard configuration (e.g., chip type and operating system as specified in Step 1004), the content of cardmember information data (gathered in Step 1006), and the intended smartcard "printer" (i.e., the apparatus used to create the finished card within service bureau 914). This allows the system, in the preceding steps, to specify file structures, data types, and the like, without concerning itself with how this structure will be encoded onto the smartcard or how the data will be accessed. Up until step 1008, the system need only develop a relatively high-level model of the intended smartcard data structure; the specifics are substantially invisible to all but CCP 912.

In an alternate embodiment, various details of the smartcard data object may be determined at a prior point in the system. That is, the functionality of CCP 912 may be distributed among various components of the system.

Having created the cardmember data set, or card object, in Step 1008, this data is then sent to CODUS 106 (Step 1010). This ensures that the DSS (particularly CODUS 106) has a record of the smartcard state at the time of personalization. This information is then immediately available to account maintenance system 142.

The card object is then sent to service bureau 914 and (if required) CCSS 916 (Step 1012). In Step 1014, the necessary keys are acquired to allow service bureau 914 to create the finished smartcard. As mentioned above, Step 1014 is suitably performed by CCSS 916 concurrently or serially with the issuance process. In one embodiment, as each individual card is being created using an issuance system suitably located at service bureau 914, service bureau 914 interrogates CCSS 916 for the appropriate cryptographic keys. These keys have either been retrieved from key systems 920 and 918 earlier (i.e., after Step 1012), or are retrieved in real-time in response to the request from service bureau 914. Alternatively, the keys may be retrieved by CCSS 916 and transmitted to CCP 912 prior to transmission of the card object to service bureau 914. In either case, the key or keys are then retrieved for inclusion in the card object created in Step 1008.

In Step 1016, the actual card is issued. Service bureau 914 suitably downloads the card object into the correct smartcard hardware using the correct cryptographic keys. The initialized smartcard may then be packaged and distributed to the appropriate cardmember in accordance with conventional methods.

Synchronization Process

A dynamic synchronization system as described above in various embodiments is used to track the "state" of the consumer's smartcard. The state of the smartcard is suitably characterized by the structure of applications used in the smartcard and the various pieces of data that are stored within these applications.

The manner in which applications and data are managed within a smartcard can vary. For example, data files and directories may be stored in a "tree" structure in smartcard 120. That is, the smartcard file structure suitably resembles the well known MS-DOS (Microsoft Disk Operating System) file structure wherein files are logically organized within a hierarchy of directories. Specifically, three types of files are defined in ISO 7816-4: dedicated files (DF), elementary files (EF), and a master file (MF). The master file is analogous to the MS-DOS "root" directory, and contains all other files and directories. Dedicated files are actually directories or "folders" for holding other DFs or EFs. Thus, the MF may contain an arbitrary number of DFs, and these DFs may or may not contain other DFs. Elementary files are used to store user data, and may exist within a dedicated file, or within the master file. Higher level DFs (i.e., DFs which house particular applications) are often referred to as application dedicated files (ADFs). The scope of the present invention is not, however, limited to this type of multifunction card. Other implementations, for example, Multos or Java-based cards, are also suitable within the context of the instant invention.

A number of synchronization issues may arise in the multi-function smartcard context; indeed, three paradigmatic cases reoccur with some frequency, and relate to: 1) update transactions, 2) pending transactions, and 3) file structure changes. Each of these cases will now be described in turn with respect to the present invention.

EXAMPLE 1

Update Transactions

It is quite common for a cardholder to make a local change to smartcard 120 which is not immediately reflected in all the databases which could advantageously make use of this information. For example, suppose that upon initialization (i.e., when the card was originally issued via personalization system 140) the cardholder's smartcard 120 was configured to reflect a general preference for smoking (e.g., one file contains a Boolean field keyed to smoking/non-smoking), but the cardholder now wishes to change this general preference file to reflect a non-smoking preference.

Figure 7:
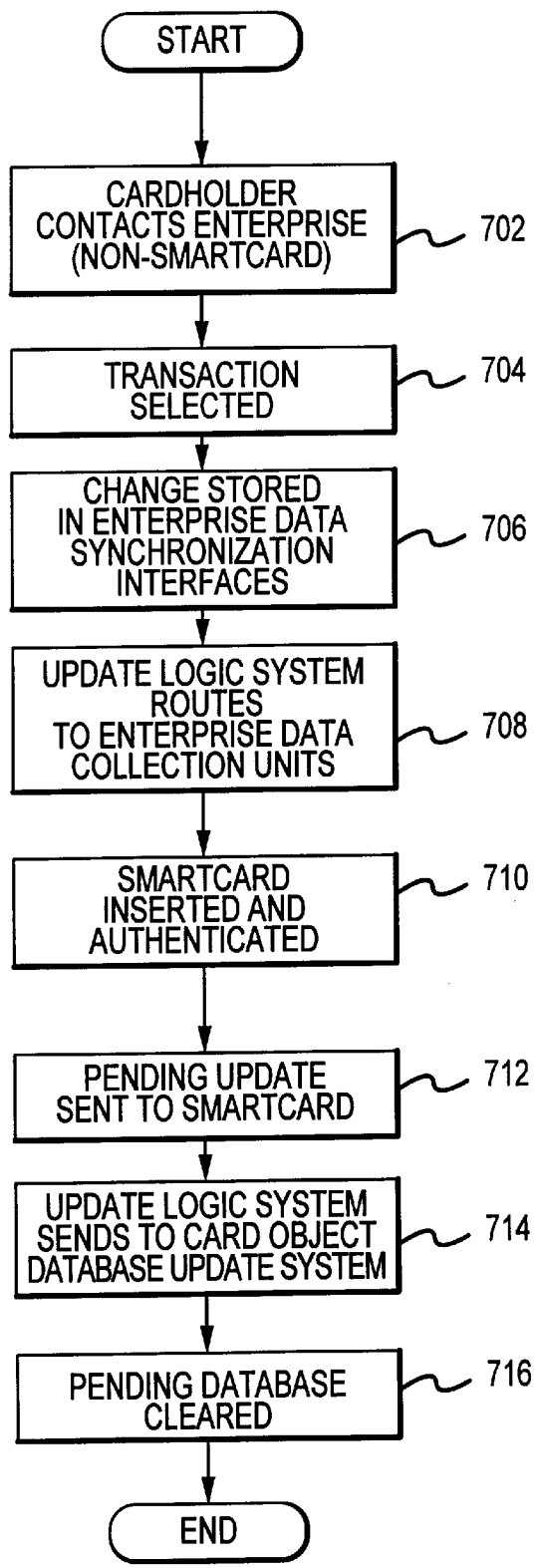
FIG. 7 is a flowchart depicting an exemplary method for synchronizing pending transaction information.

In this case, referring now to FIGS. 1, 7 with respect to a preferred embodiment of the present invention, the cardholder suitably inserts card 120 into a conveniently located access point 102, whereupon authentication of the card and/or card-reader takes place (Step 802). In a preferred embodiment, authentication takes place in accordance with relevant sections of the ISO 7816 standard.

Next, the cardholder uses a suitable user interface (supplied by the access point 102 working in conjunction with server 104) in order to perform a transaction—i.e., to request a change to the preferences file (Step 804). This change would typically be reflected at the smartcard 120 immediately. That is, the access point 102 and/or server 104 would include the functionality necessary to access and update the appropriate files within smartcard 120.

Communication router 206 in server 104 then routes the transaction to the appropriate party, i.e., an EDSI 108 or an EDCU 112, corresponding to branches 807 and 812 respectively. That is, depending on the system configuration, the file to be changed might be associated with a particular enterprise or, alternatively, might be associated with the organization hosting the DSS. These two cases are described in turn.

Figure 8:
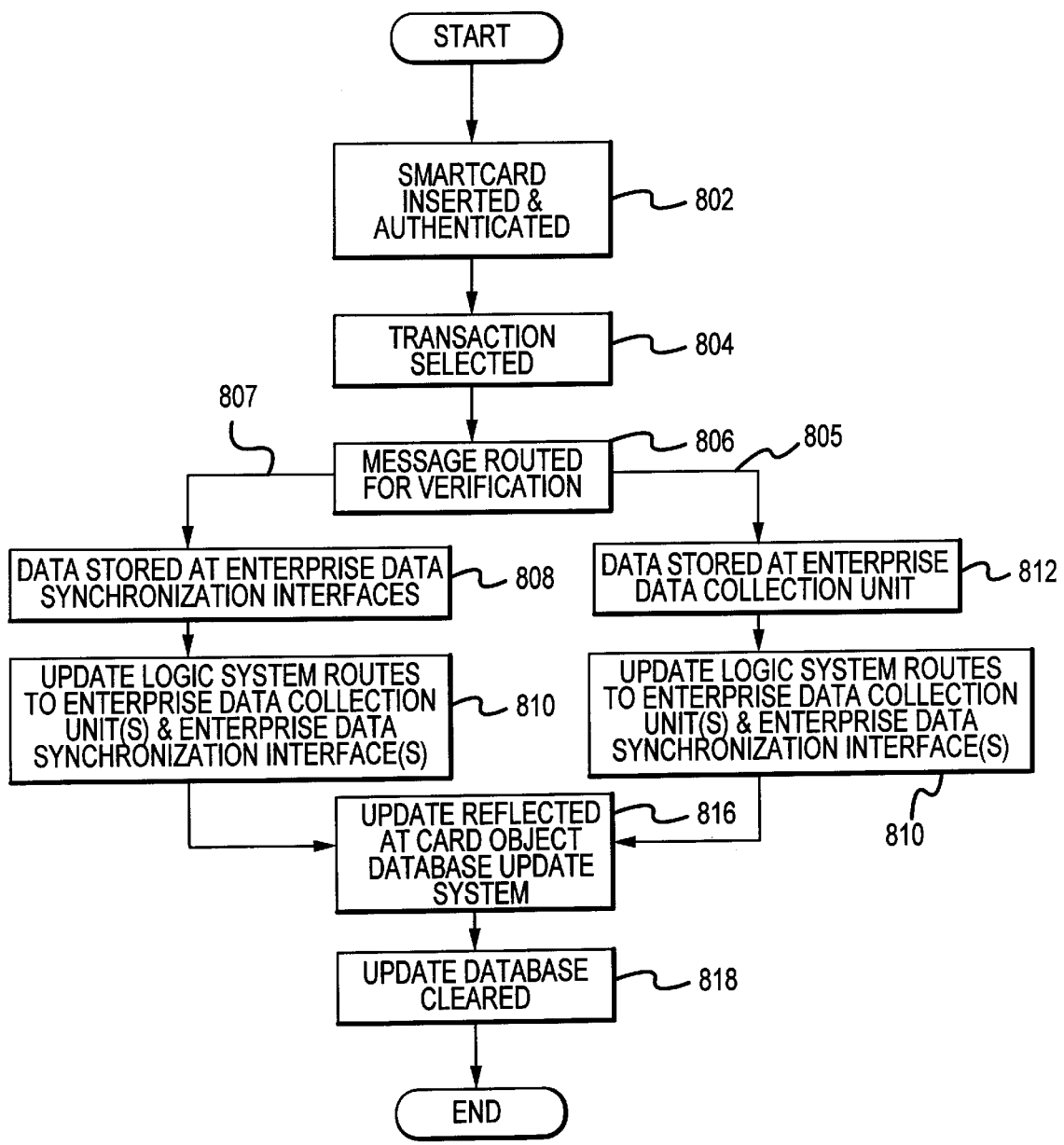
FIG. 8 is a flowchart depicting an exemplary method for synchronizing update transaction information.

Following branch 807 in FIG. 8, the change data is sent to and stored in the appropriate EDSI 108 (Step 808). Update logic system 110 then transfers this change request to the appropriate EDCU 112—i.e., the EDCU 112 corresponding to the particular EDSI (Step 810). This information is suitably stored in the corresponding update database 504. The information is also distributed to other EDSIs. In the instant example, update logic system 110 would identify those systems that would benefit from knowing the cardholder's smoking status. Such systems might include, for example, various hotels, rental car agencies, and the like.

Alternatively, following branch 805 in FIG. 8, the data may first be stored at the appropriate EDCU (Step 812), then distributed to other EDUCs 112 and EDSIs 108 as described above.

The card data change is then transferred to CODUS 106. Specifically, the various fields and files associated with the smartcard 120 are updated to reflect the change stored in update database 504. Thus, the information within CODUS 106 conforms to that contained within smartcard 120 and the various EDCUs 112 and EDSIs 108. After this transfer, the corresponding change data in update database 504 is cleared (Step 818).

EXAMPLE 2

Pending Transaction

The cardholder might make a change or perform a transaction through a channel that does not directly involve smartcard 120, thus creating an inconsistency between the data in smartcard 120 and the data in various databases throughout the DSS. Such a case might arise, for example, when the cardholder calls a hotel to make a reservation (rather than performing the transaction on line using smartcard 120) and makes an oral request to change his preferences from smoking to non-smoking. Referring now to FIGS. 1 and 7, in this case, with respect to a preferred embodiment of the present invention, the cardholder first contacts an enterprise through a means that does not include smartcard 120—i.e., a "smartcard not present" transaction (Step 702). Using an appropriate interface (voice, keypad, etc.), a change or transaction is selected (Step 704). This change is then stored locally within a particular enterprise network 114 and/or is stored within an EDSI 108 (Step 706).

Next, in Step 708, update logic system 110 routes this information to the corresponding EDCU 112, where it resides in pending database 514. At this point, smartcard 120 itself is oblivious to the change. As a result, if the cardholder were to initiate a smartcard-present transaction, the corresponding enterprise would likely look first to the data structure in smartcard 120 for preferences, and as just stated, would most likely arrive at the wrong conclusion (e.g., a smoking room might be assigned notwithstanding the cardholder's expressed preference).

In order to remedy this situation, the present invention provides, in Steps 710–712, a method by which the smartcard is updated upon its next use. That is, after the smartcard is inserted at an access point 102 and is suitably authenticated (Step 710), the system interrogates pending database 514 to determine whether any changes have been made. If so, the appropriate information is downloaded to smartcard 120 (Step 712).

After the above information transfer is successfully completed, the change data is transferred to CODUS 106, where it is stored within card object database 116. Finally, the respective information within pending database 514 is cleared (Step 716).

EXAMPLE 3

File Structure/Application Change

In addition to the data-related modifications detailed above, changes to the structure of data stored in smartcard 120 might also be desirable in certain contexts. That is, during the life of a smartcard, it is likely that the card issuer, a partnering enterprise, or the cardholder himself may desire to extend the card's functionality by augmenting the suite of applications housed within the card. For example, a cardholder who uses a smartcard for rental car and airline reservations might also wish to use the card for acquiring and paying for hotel reservations. In such a case, the appropriate hotel partner may process the cardholder's request and arrange for addition of a hotel application to be added to the smartcard file structure. In another example, the smartcard issuer might authorize the addition of a new application on its own, for example, a credit and/or debit application. Conversely, it may also be appropriate in some instances to remove applications from the card.

In a preferred embodiment, the types of file structure changes described above can be handled in a manner analogous to the procedure set forth in FIG. 7, depending, to some extent, upon which party originates the file structure change. That is, as in Step 712, the appropriate file structure change information may be stored in EDCU 112 (for example, in database 502), and then transferred to smartcard 120 when the card is used in conjunction with an on-line transaction (Steps 710 and 712). After the file structure on smartcard 120 is augmented or otherwise modified, CODUS 106 (specifically, database 116) is similarly modified to reflect the change. The change information is then cleared from database 502 (Step 716).

Although the invention has been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A system for dynamically synchronizing smartcard information associated with a smartcard, said system comprising:

a first enterprise data collection unit associated with a first enterprise, said enterprise data collection unit configured to store update transactions and pending transactions associated with said smartcard and said first enterprise;

a second enterprise data collection unit associated with a second enterprise, said second enterprise data collection unit configured to store update transactions and pending transactions associated with said smartcard and said second enterprise;

at least one access point configured to interface with said smartcard and said first and second enterprise data collection units;

a card object database system coupled to said first and second enterprise data collection units and configured to store said smartcard information in accordance with said update transactions and said pending transactions, wherein said smartcard information includes a card object having at least one application; and an update logic system configured to route said smartcard information from said first and second enterprise data collection units to said at least one access point in order to effect synchronization of said smartcard information associated with said smartcard and said card object database system.

2. A system according to claim 1, further comprising an update logic system coupled to at least one enterprise data synchronization interface, said update logic system configured to securely route card information between said enterprise data synchronization interface and said enterprise data collection units, said enterprise data synchronization interface coupled to an enterprise network configured to communicate with said access point.

3. A system according to claim 2, further comprising a secure support client server configured to communicate with said access point, said secure support client server further configured to adaptively provide communication functionality in accordance with the communication functionality available at said access point.

4. The system of claim 1, further including a personalization system comprising:

a security server;

at least one key system associated with said at least one application, said key system configured to communicate with said security server and to supply a key in response to a request from said security server;

a personalization utility configured to receive said card object and to communicate with said security server;

said personalization utility further configured to add said key to said card object, a card management system, said card management system configured to accept a card request and communicate said card request to said personalization utility; and a gather application module configured to communicate with said card management system and gather application information from a first database and a second database in accordance with said card request, wherein said first database is associated with said first enterprise, and said second database is associated with said second enterprise.

* * * * *